(12) United States Patent
Valfridsson et al.

(10) Patent No.: US 7,490,248 B1
(45) Date of Patent: Feb. 10, 2009

(54) METHOD FOR REENCRYPTION OF A DATABASE

(75) Inventors: Thomas Valfridsson, Skellefteå (SE); Ulf Mattsson, UM Cos Cob, CT (US)

(73) Assignee: Protegrity Corporation, Stamford, CT (US)

( * ) Notice: Subject to any disclaimer, the term of this patent is extended or adjusted under 35 U.S.C. 154(b) by 512 days.

(21) Appl. No.: 10/129,013

(22) PCT Filed: Nov. 13, 2000

(86) PCT No.: PCT/SE00/02219

§ 371 (c)(1),
(2), (4) Date: Sep. 27, 2002

(87) PCT Pub. No.: WO01/35226

PCT Pub. Date: May 17, 2001

(30) Foreign Application Priority Data

Nov. 12, 1999   (SE) .................................... 9904094

(51) Int. Cl.
*H04L 9/00* (2006.01)
(52) U.S. Cl. ...................... 713/193; 713/194; 713/165; 726/27; 380/277; 707/200
(58) Field of Classification Search ................. 713/193, 713/178, 194, 164, 165; 380/44, 259, 277; 707/200, 1; 726/26, 27
See application file for complete search history.

(56) References Cited

U.S. PATENT DOCUMENTS

| | | | | |
|---|---|---|---|---|
| 4,588,991 A | * | 5/1986 | Atalla | ........................ 713/165 |
| 5,778,395 A | * | 7/1998 | Whiting et al. | ............. 707/204 |
| 5,796,825 A | * | 8/1998 | McDonnal et al. | .......... 713/165 |
| 5,915,025 A | * | 6/1999 | Taguchi et al. | ................. 380/44 |
| 5,917,912 A | * | 6/1999 | Ginter et al. | ................. 713/187 |
| 5,960,086 A | * | 9/1999 | Atalla | ......................... 380/44 |
| 6,055,636 A | * | 4/2000 | Hillier et al. | .................. 726/34 |
| 6,134,660 A | * | 10/2000 | Boneh et al. | ................ 713/193 |

(Continued)

FOREIGN PATENT DOCUMENTS

JP            11-143780         5/1999

(Continued)

OTHER PUBLICATIONS

Marc Joye et al, ID-Based Secret-Key Cryptography, Technical Report TR-98-4, LCIS, Tamkang University, Taiwan, R.O.C., Apr. 1998.*

(Continued)

*Primary Examiner*—Nasser G Moazzami
*Assistant Examiner*—Shanto M Abedin
(74) *Attorney, Agent, or Firm*—Edwards Angell Palmer & & Dodge LLP; George W. Neuner; William J. Daley, Jr.

(57) ABSTRACT

A method for encryption of the content in a database, the method including the steps of detecting that a predetermined time period has elapsed, generating an unexpired encryption key, associating the unexpired encryption key with expiration information, scanning the database for an encrypted item, the encrypted item corresponding to a plaintext item, the encrypted item having been encrypted using an expired encryption key, and encrypting the plaintext item, using the unexpired encryption key, into a reencrypted item.

13 Claims, 2 Drawing Sheets

U.S. PATENT DOCUMENTS

| | | | | |
|---|---|---|---|---|
| 6,185,681 | B1 * | 2/2001 | Zizzi | 713/165 |
| 6,289,450 | B1 * | 9/2001 | Pensak et al. | 713/167 |
| 6,389,402 | B1 * | 5/2002 | Ginter et al. | 705/51 |
| 6,963,980 | B1 * | 11/2005 | Mattsson | 713/194 |
| 6,981,141 | B1 * | 12/2005 | Mahne et al. | 713/165 |
| 7,080,260 | B2 * | 7/2006 | Johnson | 713/193 |
| 7,093,137 | B1 * | 8/2006 | Sato et al. | 713/193 |
| 2002/0107877 | A1 * | 8/2002 | Whiting et al. | 707/204 |
| 2003/0110376 | A1 * | 6/2003 | Weiner et al. | 713/158 |

FOREIGN PATENT DOCUMENTS

| | | |
|---|---|---|
| JP | 11143780 A | 5/1999 |
| JP | 11143780 A * | 5/1999 |
| JP | 11143780 A * | 5/1999 |
| WO | WO 97/49211 | 12/1997 |
| WO | WO-9749211 A1 | 12/1997 |

OTHER PUBLICATIONS

World Intellectual Property Organization, International Search Report (application No. PCT/SE00/02219), Stockholm, Feb. 2, 2001.

* cited by examiner

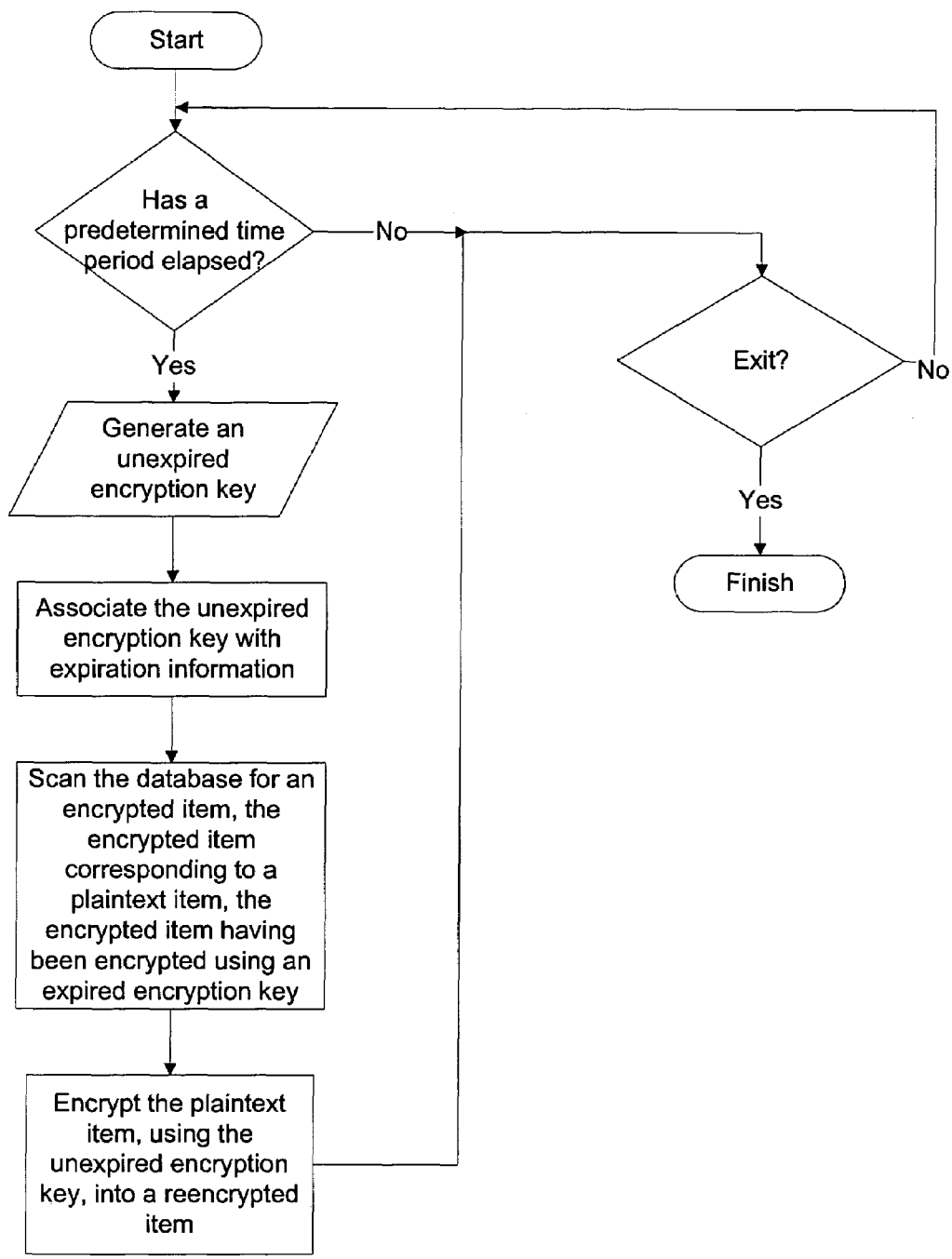

METHOD FOR REENCRYPTION OF A DATABASE

FIELD OF THE INVENTION

The present invention relates to a method for encryption of the content in a database, for accomplishing increased protection against unauthorised access to the data.

BACKGROUND OF THE INVENTION

In order to protect information stored in a database, it is known to store sensitive data encrypted in the database. To access such encrypted data you have to decrypt it, which could only be done by knowing the encryption algorithm and the specific decryption key being used. The access to the decryption keys could be limited to certain users of the database system, and further, different users could be given different access rights.

Specifically, it is preferred to use a so-called granular security solution for the encryption of databases, instead of building walls around servers or hard drives. In such a solution, which is described in the document WO 97/49211 by the same applicant, a protective layer of encryption is provided around specific sensitive data-items or objects. This prevents outside attacks as well as infiltration from within the server itself. This also allows the system manager to define which data stored in databases are sensitive and thereby focusing the protection only on the sensitive data, which in turn minimizes the delays or burdens on the system that may occur from other bulk encryption methods.

Most preferably the encryption is made on such a basic level as in the column level of the databases. Encryption of whole files, tables or databases is not so granular, and does thus encrypt even non-sensitive data. It is further possible to assign different encryption keys of the same algorithm to different data columns. With multiple keys in place, intruders are prevented from gaining full access to any database since a different key could protect each column of encrypted data.

However, there are problems with the previously known database encryption methods. Especially there is a problem to replace the old encryption keys in a 7 days by 24 hours operational database, since the database has to be taken out of operation when keys should be exchanged. Further, there is a problem accessing data for which the encryption keys have been exchanged.

SUMMARY OF THE INVENTION

The present invention provides a method for encryption of the content in a database, for accomplishing increased protection against unauthorised access to the data.

BRIEF DESCRIPTION OF THE DRAWINGS

For exemplifying purposes, the invention will be described in closer detail in the following with reference to exemplary embodiments thereof illustrated in the attached drawings wherein:

FIG. 2 shows an encryption method according to the present invention.

DESCRIPTION OF PREFERRED EMBODIMENTS

Figure 1:
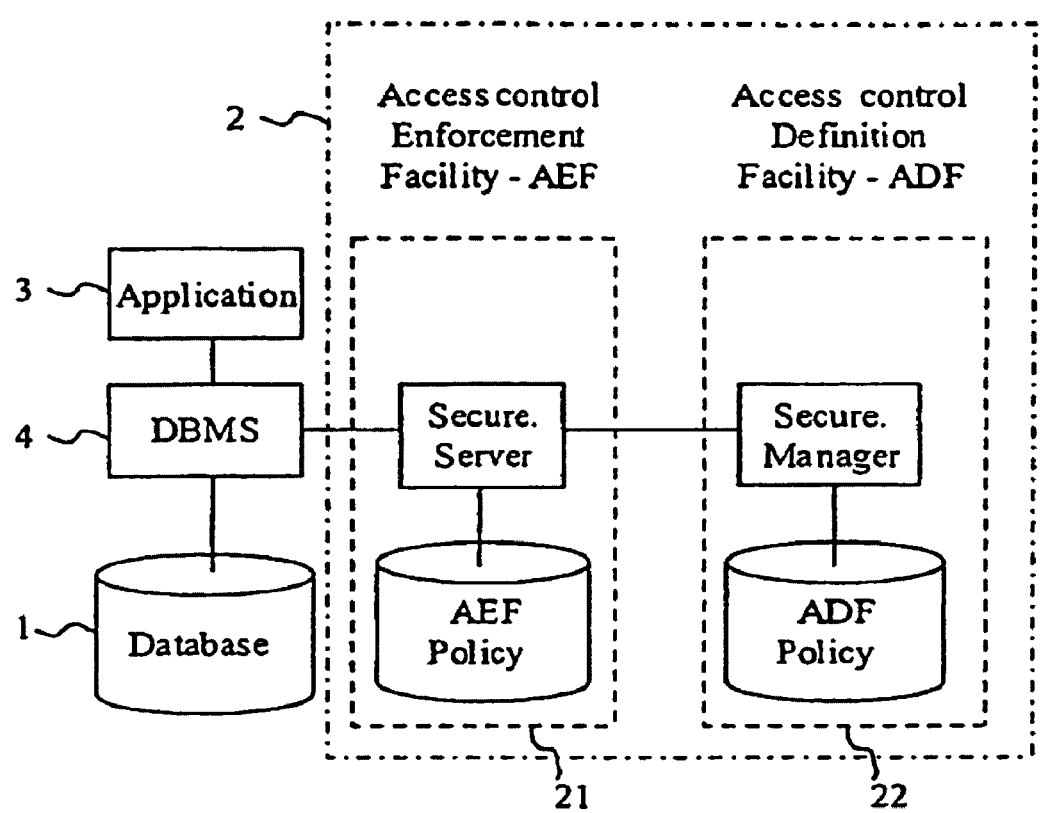
FIG. 1 shows an example of a database system using the inventive method.

Referring to FIG. 1, a database system according to at least one exemplary embodiment of the present invention is illustrated, comprising at least one database 1, at least one security system 2, and at least one client 3. The database is operated through a database management system (DBMS) 4, which is a program providing the mechanisms and functionality for systematic storage and retrieval of data from the database. The DBMS could be operated on a conventional personal computer, on a microcomputer or the like.

The security system 2 preferably comprises an access control enforcement facility (AEF) 21 and an access control definition facility (ADF) 22. The ADF provides security administration services and the AEF provides real-time enforcement of security parameters.

The ADF 22 comprises a management system, Secure.Manager, and a memory for storing the ADF policy. ADF, the security administration services facility, preferably provides a complete RBAC facility, which using a drag and drop graphical user interface could enable the security administrator to create and maintain users, functional and organizational roles and their associated access privileges. The AEF 21 comprises a management system, "Secure.Server", and a memory for storing the ADF policy. AEF, the security enforcement services facility, is central to the architecture of the inventive method. In general it should receive security policy (and updates) via secure transmission from ADF. Further, it controls real-time access to all protected elements of the database 1 at the appropriate granularity.

The security system 2 could be operated on a conventional personal computer, on a microcomputer or the like. Further, it could be operated on the same computer as the DBMS, or on a separate computer connected to the DBMS computer by a data network.

In the database according to at least one exemplary embodiment of the present invention a granular security solution is used, where the items of the database is individually encrypted. Further, information about the encryption keys used for the specific database item are stored in association with the item. Most preferably the encryption is made on such a basic level as in the column level of the databases. It is further possible to assign different encryption keys of the same algorithm to different data columns. With multiple keys in place, intruders are prevented from gaining full access to any database since each column of encrypted data is protected by a different key.

The information about the encryption keys stored in association with the database items, e.g. database rows, could be provided by storage of a hash value of the encryption key together with the encrypted data for each row.

The data for each row and column is preferably stored together with an encryption key generation counter. The data for each row and column can be concatenated with the encryption key generation counter.

The databases could e.g. be Oracle 8.0.5 or Informix 9.14, but several other commercially available databases are possible to use with an exemplary embodiment of the present inventive method. The platforms for the database system could e.g. be NT, HP-UX, Sun Solaris or AIX. The encryption algorithm used by an exemplary embodiment of the present invention could e.g. be DES, and both software and hardware encryption could be used. More generally, the encryption used by an exemplary embodiment of the present invention may concern any form of encryption, and is especially to concern methods of conversion including hashing.

According to an exemplary embodiment of the present invention the encryption keys are replaced and updated automatically. This is achieved by defining a length of a time period to be used, deciding, for each time period at least one encryption key to be used when entering new database items to the database is decided, associating each encryption key with a life time value, and indicating the number of time periods during which the key will be valid. Hereby it is possible to scan the database to discover items with no longer valid encryption keys and replace such discovered invalid keys with keys assigned to the current time period.

Thus, the database reencrypt feature is based on multiple active keys and a timestamp for the last update time associated, preferably as a column or part of a data column, with each row or data item. Each key is preferably unique for each item and generation of keys, i.e. keys generated during the same period. For example, the period P could be a week, whereby the key generation for week one in year 1999 could be identified as 199901. A new key generation is generated when a new period P starts.

Each key has a specific lifetime value L, stored in the database for the security system, i.e. the number of time periods during which the key is valid. The lifetime could vary between different keys.

The table of historic keys is preferably stored in the database for the security system. Storing the old keys enables decryption of historic generations of data.

Further, each item or row in the database comprises a timestamp indicating when it was last updated. Each row may contain columns encrypted with potentially different key generations.

When new items are entered into to the database for the current time period P is used, and for reading items from the database data is decrypted with the matching key of the active keys. When a new period is entered a key scan operation is started, preferably as a background process started. In this operation no longer valid keys are replaced by presently active keys. The key scan operation need not be started immediately after entering the new period, but is preferably executed as soon after the entrance as possible.

Example of an Operational Scenario

The method according to an exemplary embodiment of the present invention will now be further described by way of an exemplary operational scenario. The time period P is here decided to be one week. Each row has a timestamp (week) for last update. Each key have a life time of L (weeks). A column C1 in the database could e.g. have the structure:

| Column C1 |
|---|
| Data Value A and encryption key generation counter |
| Data Value B and encryption key generation counter |
| Data Value C and encryption key generation counter |

For an object I1 the key life L is decided to 2 weeks. Hence, after two weeks the active keys for object I1 will be from both key generation 1 and 2. If application data C is input to item 1 during week 1 and A and B during week 2 we will therefore have the following situation:

| Column C1 | TimeStamp (week) | KeyGen |
|---|---|---|
| A | 2 | 2 |
| B | 2 | 2 |
| C | 1 | 1 |

When week 3 starts key generation 3 is created, and the table of active key generations for object I1 will now contain key generations 3 and 2. The table of historic keys for item 1 will contain key generation 1. At this time the application data of the first row in column C1 is updated, and the newly stored data will be encrypted by a key from the current key generation 3, whereby the following situation is achieved:

| Column C1 | TimeStamp (week) | KeyGen |
|---|---|---|
| A | 3 | 3 |
| B | 1 | 2 |
| C | 1 | 1 |

However, the key scanning operation started at the beginning of period 3 will discover that the presence of a now non-valid key generation 1 for row C, and this key will therefore be updated, providing the following situation:

| Column C1 | TimeStamp (week) | KeyGen |
|---|---|---|
| AA | 3 | 3 |
| B | 2 | 2 |
| C | 3 | 3 |

When week 4 starts key generation 4 is created. The table of active key generations for object I1 will now comprise key generations 4 and 3, while the table of historic keys will comprise the key generations 2 and 1.

The application data after the key scanning operation and updating will be:

| Column C1 | TimeStamp (week) | KeyGen |
|---|---|---|
| AA | 3 | 3 |
| B | 4 | 4 |
| C | 3 | 3 |

When week 5 starts the key life L for I1 is changed to 1 week. Further, key generation 5 is created. Due to the shorter key life, the table of active keys for item 1 will now only contain key generation 5, and the table of historic keys at the same time contain the key generations 4, 3, 2 and 1. After the key scanning and updating operations the application data situation for object I1 will be as follows:

| Column C1 | TimeStamp (week) | KeyGen |
|---|---|---|
| AA | 5 | 5 |
| B | 5 | 5 |
| C | 5 | 5 |

When week 6 starts key generation 6 is created, and the table of active keys for item 1 will now contain key generation 6, and the table of historic keys the key generations 5, 4, 3, 2 and 1. If the item in the second row, B, is now updated the following situation will be achieved:

| Column C1 | TimeStamp (week) | KeyGen |
|---|---|---|
| AA | 5 | 5 |
| BB | 6 | 6 |
| C | 5 | 5 |

However, after the key scanning and updating operation they keys for AA and C will be replaced to key generation 6 as well.

In an exemplary embodiment, the present invention assures that every row and item is re-encrypted with a valid key. More specifically this process, the so-called KeyLife process, is executed every time a row is inserted, updated or retrieved after a scanning operation. The key life value, defining the number of days a key is valid for each item, could differ for the items, and could typically be between 30 and 90 days. The scanning operation, checking the validity of the presently used keys, the so called KeyLife checking, is executed each time a new key generation is created.

We have now described an exemplary embodiment of the present invention. However, several alternatives are possible and feasible. For example, the database items may have different sizes and structure, the inventive method may be operated on a single computer or on a computer network, different types of encryption may be used, different lifetimes for the keys may be set, etc. Such modifications must be considered to be within the scope of the present invention, as it is defined by the enclosed claims.

The invention claimed is:

1. A method for re-encrypting one or more data items that are encrypted and stored in a database, where said re-encrypting being an automated background process, said method for re-encrypting comprising the steps of:
   in an initial time period, encrypting and storing the one or more data items in the database, wherein:
      (1) the one or more data items are encrypted using an encryption key having a key life,
      (2) the key life is associated with the one or more stored encrypted data items,
      (3) a time stamp is stored one of with the encrypted one or more data items or in a another table or data set, and
      (4) where the time stamp is representative of a time period during which the encryption key used to encrypt the one or more data items was generated or started to be used and representative of the time period the one or more encrypted items were last updated or inserted into the database;
   entering a next time period, the next time period being at least subsequent to the time period(s) during which the one or more data items were updated or inserted into the database and having a corresponding time length, and wherein:
   generating a new encryption key with an associated key life at the start of the next time period;
   scanning the data base and identifying whether any of the one or more encrypted data items were previously encrypted using an encryption key now determined to be expired, wherein key expiration being determined from the key life and time stamp associated with the encrypted one or more data items in the database; and
   identifying any of the one or more encrypted data items stored in the database that were determined to be previously encrypted using a now expired encryption key, and wherein:
      (a) decrypting each of the identified one or more data items and re-encrypting each of the identified one or more data items using the new encryption key,
      (b) changing the key life of the re-encrypted one or more encrypted data items to correspond to the key life for the new encryption, and
      (c) storing another time stamp and an encryption key generation counter with the re-encrypted one or more data items, where the another time stamp is representative of the next time period.

2. The method of claim 1, further comprising:
   storing expired encryption key information in an historic key table;
   storing unexpired encryption key information in an active key table; and
   determining if any of the one or more encrypted data items stored in the database were previously encrypted using a now expired encryption key, said method further includes;
   deleting the expired key information from the active key table; and
   storing the expired key information in the historic key table.

3. A method according to claim 1, wherein said scanning step is performed automatically one of after insertion of a new row into the database, updating of an existing row in the database or retrieval of content from the existing row in the database.

4. A method according to claim 1, wherein the key life is between 30 and 90 days in the future.

5. The method of claim 1, further comprising the steps of:
   storing unexpired encryption key information in a key table; and
   wherein in the case where it is determined that any of the one or more encrypted data items stored in the database were previously encrypted using a now expired encryption key said method further includes marking the expired encryption key information in the key table as a historic key.

6. A method according to claim 1, wherein said storing that is performed after said scanning step further includes storing a hash value of the new encryption key in the database along with the one or more stored encrypted data items.

7. The method of claim 1, wherein said previously encrypting and storing further includes:
   storing with the one or more encrypted data items an encryption key generation counter, the encryption key generation counter representing the number of time periods since the encryption key used to encrypt the one or more data items was generated; and
   wherein said scanning step further includes, using the encryption key generation counter, along with the key life, to determine whether the encryption key of any of the one or more encrypted stored data items is now expired.

8. The method of claim 1, wherein said scanning the data base is automatically started a period of time after entering the next time period.

9. The method of claim 1, wherein there are a plurality of data items and wherein a plurality of encryption keys are in use at any given time for encrypting the plurality of data items.

10. A method according to claim 6, wherein said previously encrypting and storing includes storing a hash value representative of the encryption key used to previously encrypt the one or more data items stored in the database along with the one or more stored encrypted data items and wherein said scanning step further includes using the previously stored hash value to determine whether the encryption key of any of the one or more encrypted stored data items is now expired.

11. A method according to claim 7, further comprising incrementing the encryption key generation counter for each time period entered subsequent to the time period in which the one or more data items were previously encrypted and stored in the database.

12. A system comprising
- a computer on which is stored a program including instructions that are configured so as to carry out a method for re-encrypting one or more data items that are encrypted and stored in a database, wherein said method includes the steps of:
- in an initial time period, encrypting and storing the one or more data items in the database, wherein:
  - (1) the one or more data items are encrypted using an encryption key having a key life,
  - (2) the key life is associated with the one or more stored encrypted data items,
  - (3) a time stamp is stored one of with the encrypted one or more data items or in a another table or data set, and
  - (4) where the time stamp is representative of a time period during which the encryption key used to encrypt the one or more data items was generated or started to be used and representative of the time period the one or more encrypted items were last updated or inserted into the database;
- entering a next time period, the next time period being at least subsequent to the time period(s) during which the one or more data items were updated or inserted into the database and having a corresponding time length, and wherein:
- generating a new encryption key with an associated key life at the start of the next time period;
- scanning the data base and identifying whether any of the one or more encrypted data items were previously encrypted using an encryption key now determined to be expired, wherein key expiration being determined from the key life and time stamp associated with the encrypted one or more data items in the database; and
- identifying any of the one or more encrypted data items stored in the database that were determined to be previously encrypted using a now expired encryption key, and wherein:
  - (a) decrypting each of the identified one or more data items and re-encrypting each of the identified one or more data items using the new encryption key,
  - (b) changing the key life of the re-encrypted one or more encrypted data items to correspond to the key life for the new encryption, and
  - (c) storing another time stamp and an encryption key generation counter with the re-encrypted one or more data items, where the another time stamp is representative of the next time period.

13. A system comprising:
- a computer for executing a program for re-encrypting one or more data items that are encrypted and stored in a database, where said re-encrypting being an automated background process; and
- wherein said program is configured to perform the method steps of:
- in an initial time period, encrypting and storing the one or more data items in the database, wherein:
  - (1) the one or more data items are encrypted using an encryption key having a key life,
  - (2) the key life is associated with the one or more stored encrypted data items,
  - (3) a time stamp is stored one of with the encrypted one or more data items or in a another table or data set, and
  - (4) where the time stamp is representative of a time period during which the encryption key used to encrypt the one or more data items was generated or started to be used and representative of the time period the one or more encrypted items were last updated or inserted into the database;
- entering a next time period, the next time period being at least subsequent to the time period(s) during which the one or more data items were updated or inserted into the database and having a corresponding time length, and wherein:
- generating a new encryption key with an associated key life at the start of the next time period;
- scanning the data base and identifying whether any of the one or more encrypted data items were previously encrypted using an encryption key now determined to be expired, wherein key expiration being determined from the key life and time stamp associated with the encrypted one or more data items in the database; and
- identifying any of the one or more encrypted data items stored in the database that were determined to be previously encrypted using a now expired encryption key, and wherein:
  - (a) decrypting each of the identified one or more data items and re-encrypting each of the identified one or more data items using the new encryption key,
  - (b) changing the key life of the re-encrypted one or more encrypted data items to correspond to the key life for the new encryption, and
  - (c) storing another time stamp and an encryption key generation counter with the re-encrypted one or more data items, where the another time stamp is representative of the next time period.

\* \* \* \* \*